F. C. BIRUM.
AUTOMATIC SANITARY CONTAINER.
APPLICATION FILED MAY 3, 1915.
1,197,098.
Patented Sept. 5, 1916.
2 SHEETS—SHEET 2.
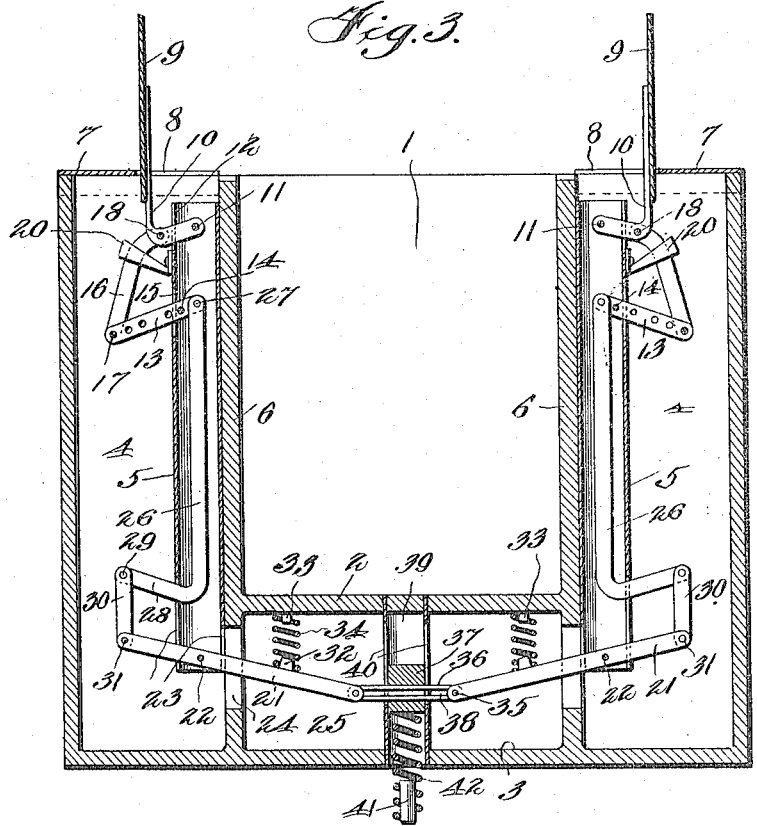
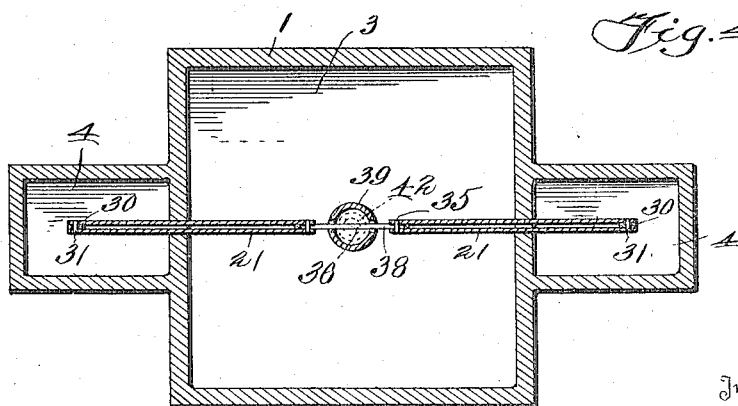
Witnesses
Inventor
F. C. Birum,

# UNITED STATES PATENT OFFICE.

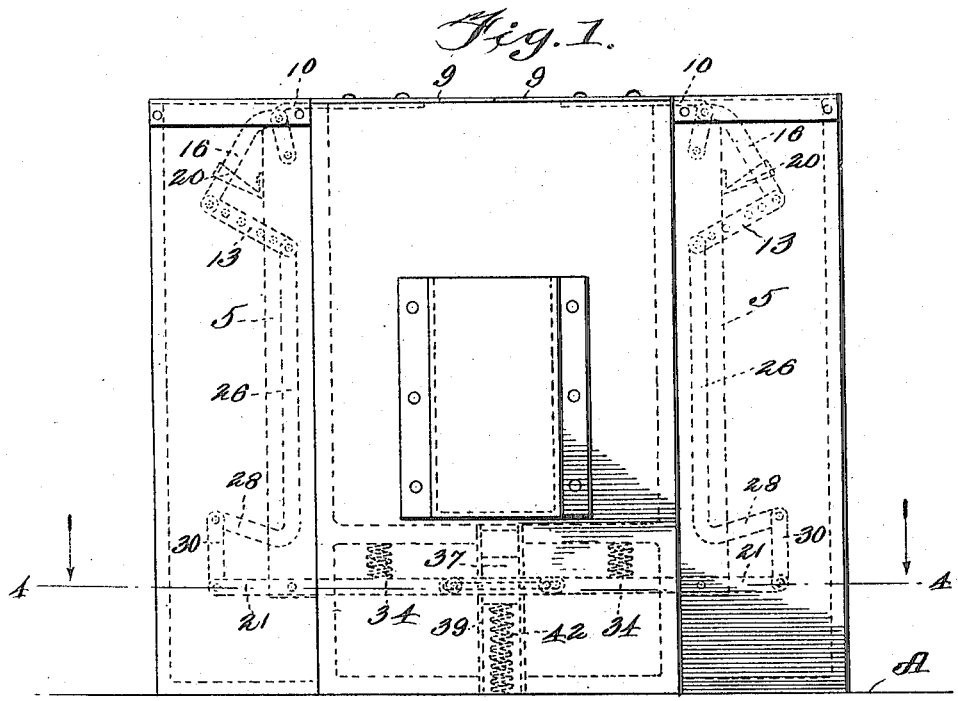
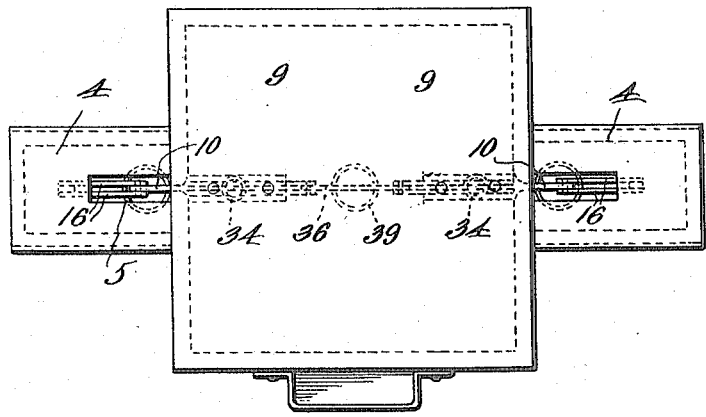

FREDERICK C. BIRUM, OF OSAGE, IOWA.

AUTOMATIC SANITARY CONTAINER.

1,197,098.   Specification of Letters Patent.   Patented Sept. 5, 1916.

Application filed May 3, 1915.   Serial No. 25,566.

*To all whom it may concern:*

Be it known that I, FREDERICK C. BIRUM, a citizen of the United States, residing at Osage, in the county of Mitchell and State of Iowa, have invented certain new and useful Improvements in Automatic Sanitary Containers; and I do hereby declare the following to be a full, clear, and exact description of the invention, such as will enable others skilled in the art to which it appertains to make and use the same.

This invention is an improved sanitary container for sugar and other like commodities, a cover for the container and means to automatically open the cover when the container is lifted from a shelf, table or other support and to automatically close the cover when the container is placed on a supporting object, so that the container is kept closed by its cover whenever the container is not in use and is automatically opened to afford easy access to its contents by a spoon, scoop or the like when the container is lifted by the hand.

The invention consists in the construction, combination and arrangement of devices hereinafter described and claimed.

In the accompanying drawings:—Figure 1 is a side elevation of a container constructed in accordance with my invention, showing the same with its cover closed as when the container is placed on a table or other like supporting object. Fig. 2 is a plan of the same. Fig. 3 is a vertical central sectional view of the same, showing the container as while being lifted and with its cover opened. Fig. 4 is a horizontal sectional view of the same on the plane indicated by the line 4—4 of Fig. 1.

In the embodiment of my invention here shown the container 1 is shown as provided with a bottom 2 and with a false bottom or base 3. On opposite sides of the container are chambers 4 which extend vertically and also extend outwardly therefrom and the walls of which form handles by means of which the container may be grasped from either or both sides and readily lifted from a table, shelf or other supporting object. In each chamber 4 is a tubular casing 5 the said casings being here shown as secured to the walls 6 of the container. The main body of the container is open. Each chamber 4 has a closure 7 for its upper end, each of said closures having a slot 8.

In accordance with my invention I provide a cover for the container which comprises a pair of members 9 that are arranged at opposite sides thereof and each of which is provided on its under side at its center, with an outwardly and downwardly extending angled arm 10. Each angled arm is pivotally mounted in the upper end of one of the tubular casings 5 on a suitable pivot pin 11 and is arranged to operate in a vertical slot 12 of said casing. Below and spaced from each angled arm is a lever 13. The pivots 14 of said levers are secured in said casings and said levers operate in slots 15 in the casings and extend outwardly therefrom, a pair of links 16 connecting each of said levers to one of the angled arms, the links being pivotally connected at their lower ends to the levers as at 17 and at their upper ends to the angled arms, in the angles of the latter as at 18. Guide arms 20 project outwardly and upwardly from the casings 5 and operate between said links.

A lever 21 is pivotally mounted as at 22 in the lower portion of each casing 5, operates in slots 23 of the casing and in slots 24 of the lower extensions of the walls 6 of the container so that the inner ends of said levers are arranged in a chamber 25 formed below the bottom 2 of the container. Angled links 26 are arranged for vertical movement in the casings 5 their upper ends being pivotally connected as at 27 to the inner ends of the levers 13 and their lower outturned arms 28 being pivotally connected as at 29 to the upper ends of links 30, the lower ends of said links being pivotally connected as at 31 to the outer ends of the levers 21. Each of said levers has a stud 32 on its upper side at a suitable distance from its inner end. The bottom 2 has studs 33 on its lower side, above the studs 32, and coiled springs 34 are provided the upper ends of which are engaged around the studs 33, their lower ends bearing on the levers 21, and engaging around the studs 32. These springs force the inner ends of the levers 21 downwardly when the container is lifted and hence cause the outer ends of said levers, through the instrumentality of the links 30 to thrust the angled links 26 upwardly, causing said angled links to move the inner ends of the levers 13 upwardly so that the outer ends of said levers, which move downwardly, through the instrumentality of the links 16 cause the angled arms 10 to turn outwardly on their pivots 11 and thereby raise the cover or lid members 9 to vertical position and hence open the container so that its contents may be readily gotten at by a spoon or other implement.

The inner ends of the levers 21 are slidably connected by pivots 35 to a link 36 which passes through a follower 37. The said link has a slot 38 in which the pivots 35 operate and the said follower is arranged for vertical movement in a guide tube 39 which connects the bottom and the false bottom and is arranged centrally of the container. Said guide tube has slots 40 in which the link 36 operates. A tappet 41 is also arranged to operate in the guide tube and is connected to the follower 37 by a cushioning coiled spring 42. When the container is lifted and its cover is opened by the action of the springs 34 and the connections hereinbefore described the follower 37 and the tappet 41 move downwardly, so that the tappet is projected below the base 3 of the container. When the container is placed on a table or other supporting object as at A in Fig. 1 the tappet is thrust upwardly, thereby moving the follower 37 upwardly and hence the said follower through the instrumentality of the link 36 moves the inner ends of the levers 21 upwardly against the tension of the springs 34 thereby causing said levers and the parts 30, 26, 13, 16 and 10 to close the members of the cover by turning them inwardly on the pivots 11 as will be understood.

Having thus described my invention I claim:—

1. A container of the class described having a pivotally mounted cover, a vertically movable tappet arranged to project below the base of the container when the latter is raised, a lever connected to the tappet for operation thereby, a spring to move said lever in one direction when the container is lifted, a second lever, a link connecting the second lever to the cover to operate the latter, an angled link connected to the second lever and a link connecting the angled link to the first named lever.

2. A container of the class described having a pivotally mounted cover, a vertically movable tappet arranged to project below the base of the container when the latter is raised, a lever connected to the tappet for operation thereby, a spring to move said lever in one direction when the container is lifted, a second lever, a link connecting the second lever to the cover to operate the latter, an angled link connected to the second lever and a link connecting the angled link to the first named lever, a guide for the tappet, a follower in said guide, a connection between said follower and the first named lever, and a cushioning spring connecting the follower and the tappet.

3. In a device of the character described comprising a container, a false bottom formed on said container, chambers formed on the container, tubular casings secured to the container, operating means carried by said casings, doors pivotally connected to said casing and pivotally connected to the operating means, and means for operating said operating means to open and close the doors.

4. In a device of the character described comprising a container, a false bottom formed on said container, chambers formed on the container, tubular casings secured to the container, and within said chambers, doors pivotally connected to said casing, and means carried by the casings and extending into the chambers for operating said doors.

5. In a device of the character described comprising a container, a false bottom formed on said container, chambers formed on the side walls of the container, tubular casings secured to the container and within said chambers, doors pivotally connected to said casings, levers pivotally secured to the lower ends of the casings, means for connecting said levers to the doors, and means for operating said levers to open the doors.

6. In a device of the character described comprising a container, a false bottom formed on said container, chambers formed on the side walls of the container, tubular casings secured to the container and within the chambers, doors pivotally connected to the upper ends of said casings, levers pivotally mounted on the lower ends of said casings and extending into a chamber formed between the bottom wall of the container and the false bottom, means for connecting the outer ends of the levers to the doors, means for operating the inner ends of said levers so as to open and close the doors.

7. In a device of the character described comprising a container, a false bottom formed on said container, chambers formed on the sides of the container, tubular casings secured to the container and within said chambers, doors pivotally secured to the upper ends of said casings, levers pivotally connected on the lower ends of said casings and extending into a chamber formed between the bottom wall of the container and the false bottom, a series of links and levers connecting the outer ends of each of said levers to each of the doors, lugs formed on first mentioned levers, springs mounted on said lugs and adapted to bear against the bottom of the container normally pressing first mentioned levers downwardly and means for operating the inner ends of the first mentioned levers to open and close the doors.

8. In a device of the character described comprising a container, a false bottom formed on said container, chambers formed on the container, tubular casings secured to the container and within the chambers, doors pivotally connected to the upper ends of said casings, levers pivotally mounted to the lower ends of said casings and extending into the chamber formed between the bottom of the container and the false bottom, means for connecting the outer ends of said levers to the doors, means for normally holding the inner ends of the levers downwardly, a vertical cylindrical guide mounted between the bottom wall of the container and the bottom of the false bottom, said vertical cylindrical guide provided with a slot therein, follower slidably mounted in said cylindrical guide, a link mounted in said follower and adapted to extend through the slot of the cylindrical guide and pivotally connected to the inner ends of the levers, a coil spring secured to said follower, and a tappet secured to said coil spring for operating said follower.

9. In a device of the character described comprising a container, a false bottom formed on said container, chambers formed on the container, tubular casings secured to the container, doors pivotally secured to the upper ends of said casings, levers pivotally mounted to the lower ends of said casings, means for connecting the outer ends of the levers to the doors and adapted to operate within the cylindrical casings and the chambers, and means for operating the inner ends of said levers to open and close the doors.

In testimony whereof I affix my signature in presence of two witnesses.

FRED. C. BIRUM.

Witnesses:
 VERA C. SULLIVAN,
 VERN TENNEY.

Copies of this patent may be obtained for five cents each, by addressing the "Commissioner of Patents, Washington, D. C."